US006474545B1

(12) United States Patent
Haeno et al.

(10) Patent No.: US 6,474,545 B1
(45) Date of Patent: Nov. 5, 2002

(54) DIGITAL CASH SAFE

(75) Inventors: Tadashi Haeno, Kawasaki (JP);
Shigeru Hashimoto, Kawasaki (JP);
Takumi Kishino, Kawasaki (JP);
Koken Yamamoto, Kawasaki (JP);
Toshiaki Ibi, Kawasaki (JP); Yasuyuki Higashiura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/365,200

(22) Filed: Aug. 2, 1999

(30) Foreign Application Priority Data

Jan. 27, 1999 (JP) .......................................... 11-018505

(51) Int. Cl.[7] .............................................. G06F 17/00
(52) U.S. Cl. ........................ 235/379; 235/380; 235/381
(58) Field of Search .................................. 235/379, 380, 235/381

(56) References Cited

U.S. PATENT DOCUMENTS

| | | | | |
|---|---|---|---|---|
| 4,621,326 A | * | 11/1986 | Rawlins | 235/379 X |
| 5,453,601 A | * | 9/1995 | Rosen | 235/379 |
| 5,644,118 A | * | 7/1997 | Hayashida | 235/379 |
| 5,691,525 A | * | 11/1997 | Aoki et al. | 235/379 |
| 5,726,430 A | * | 3/1998 | Ruggirello | 235/379 |
| 6,059,186 A | * | 5/2000 | Iijima | 235/379 |
| 6,112,984 A | * | 9/2000 | Snavely | 235/379 |
| 6,137,409 A | * | 10/2000 | Stephens | 340/568.1 |

FOREIGN PATENT DOCUMENTS

| JP | 57-169873 A | * | 10/1982 |
|---|---|---|---|
| JP | 57-193859 A | * | 11/1982 |

* cited by examiner

Primary Examiner—Michael G. Lee
Assistant Examiner—Daniel Walsh
(74) Attorney, Agent, or Firm—Armstrong, Westerman & Hattori, LLP

(57) ABSTRACT

As an alarm reception flag offers an "ON" state indicating that a sign of an occurrence of abnormality on a digital cash module associated with the alarm reception flag is detected, a control unit of a digital cash safe performs on a priority basis a processing for transfer of digital cash data to an IC card, which is the primary service of the digital cash safe, and simultaneously performs a save processing for digital cash data stored in the digital cash module on which a sign of abnormality is detected.

5 Claims, 10 Drawing Sheets

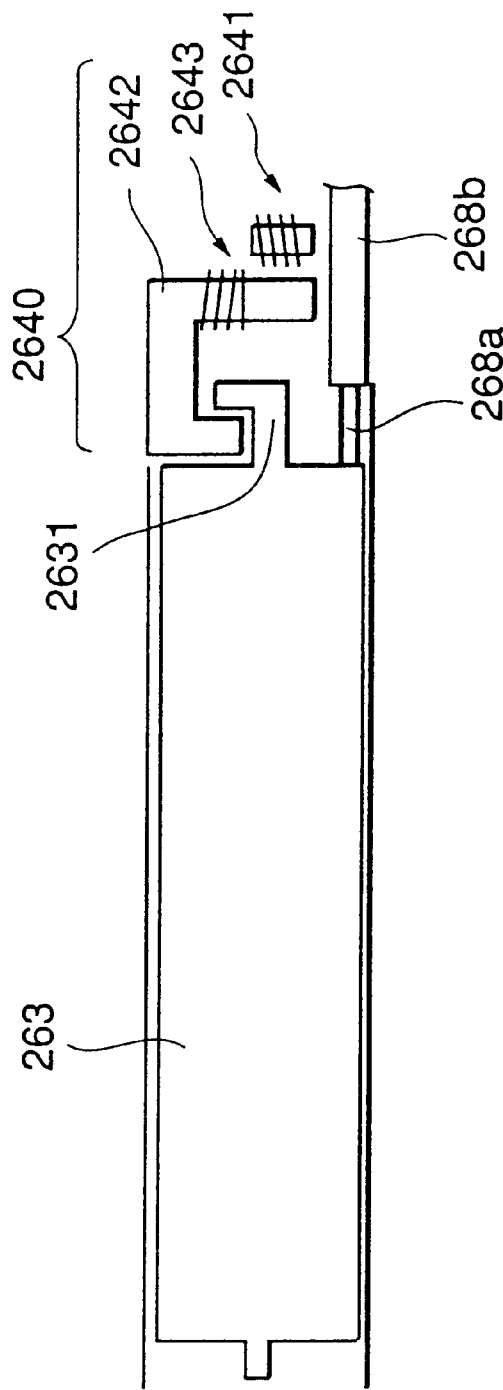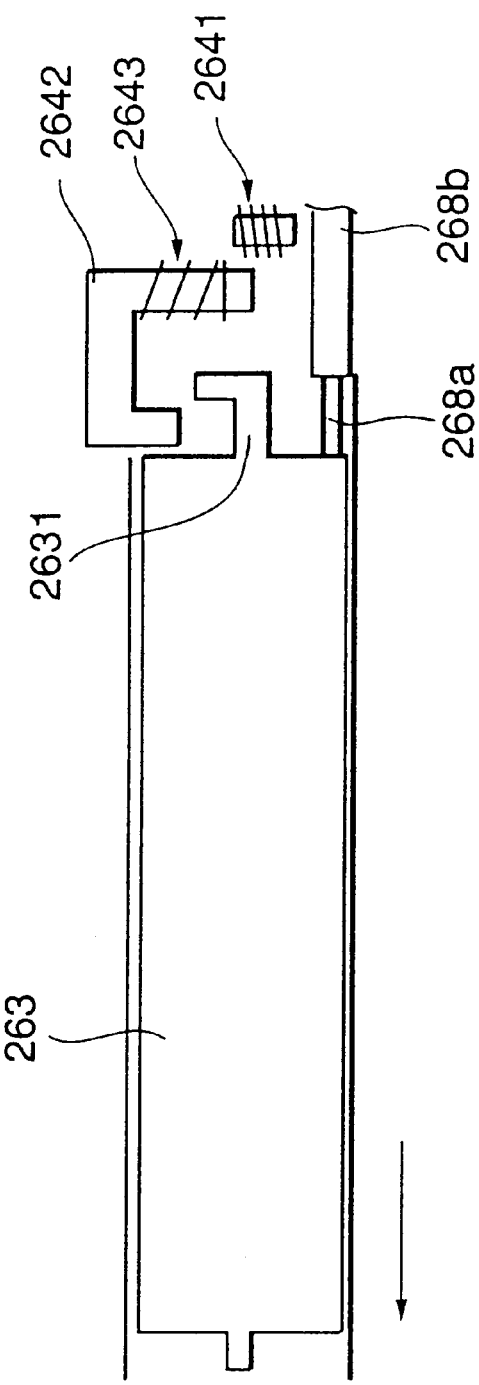

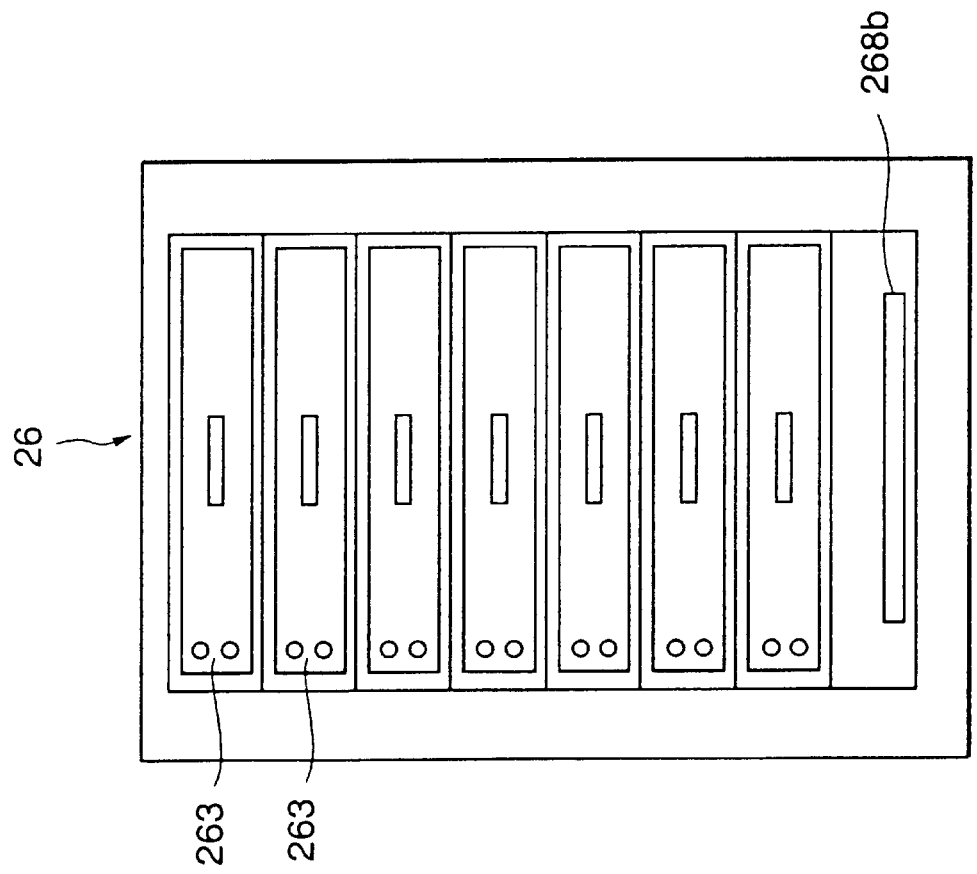

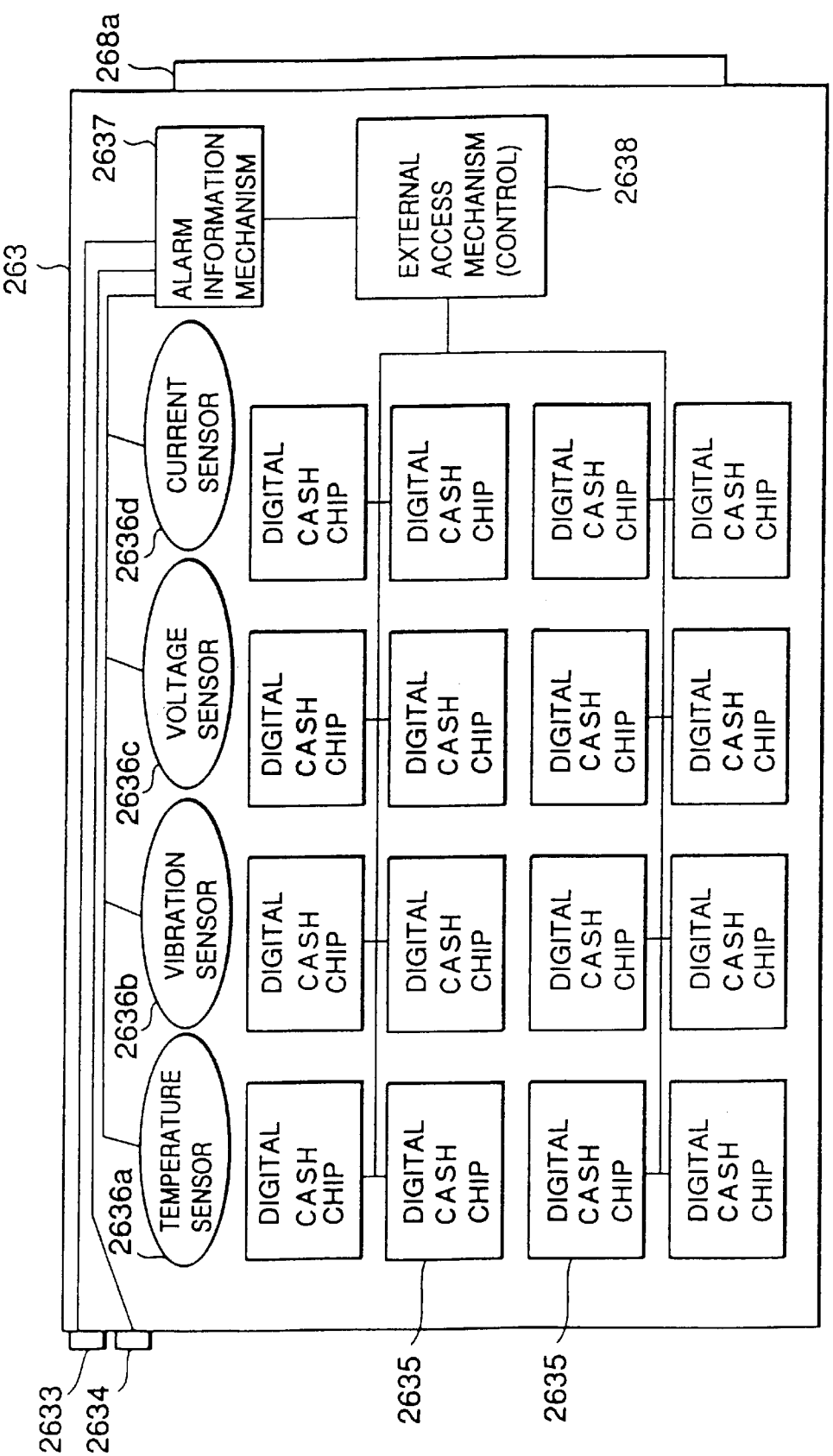

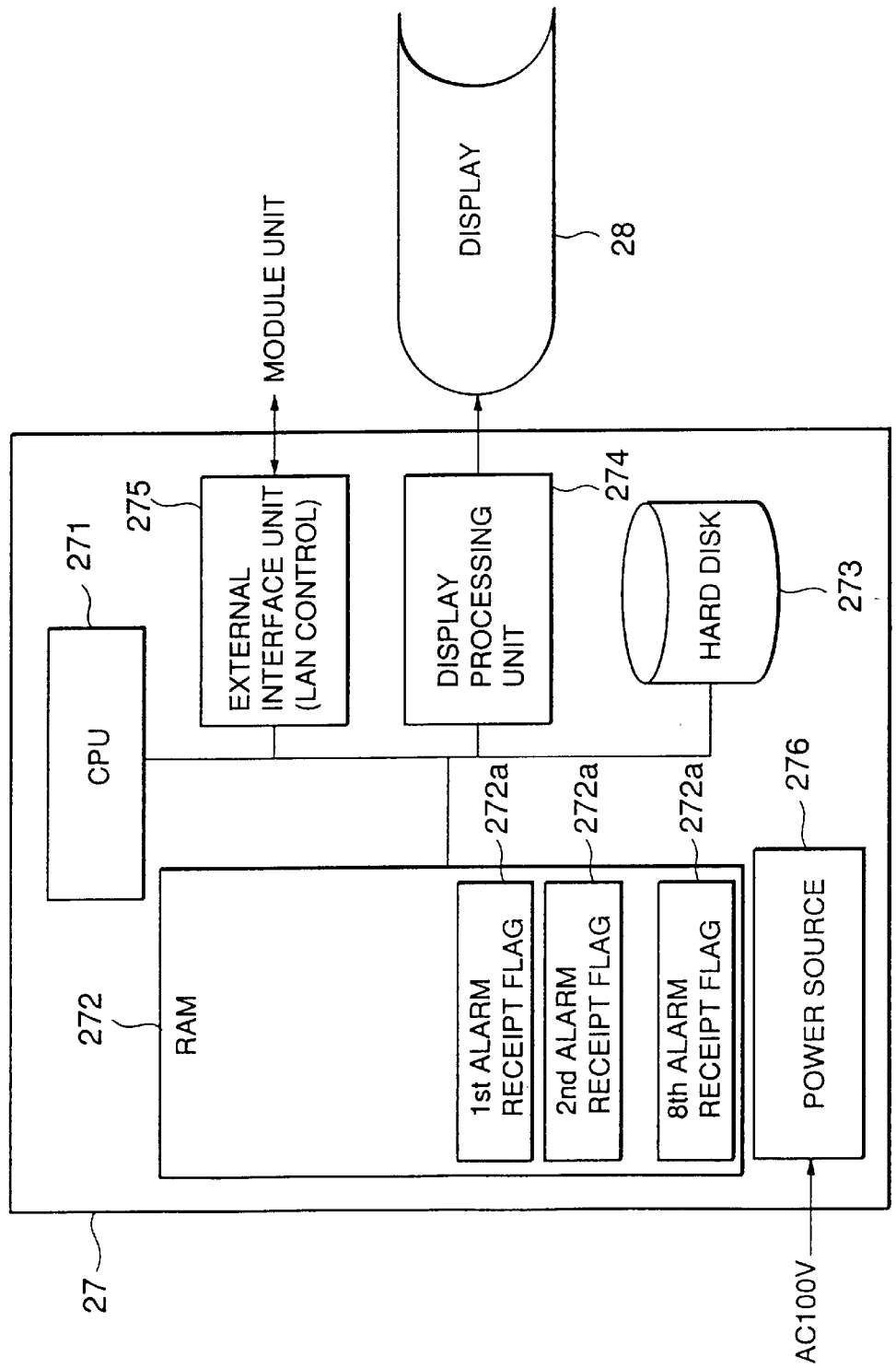

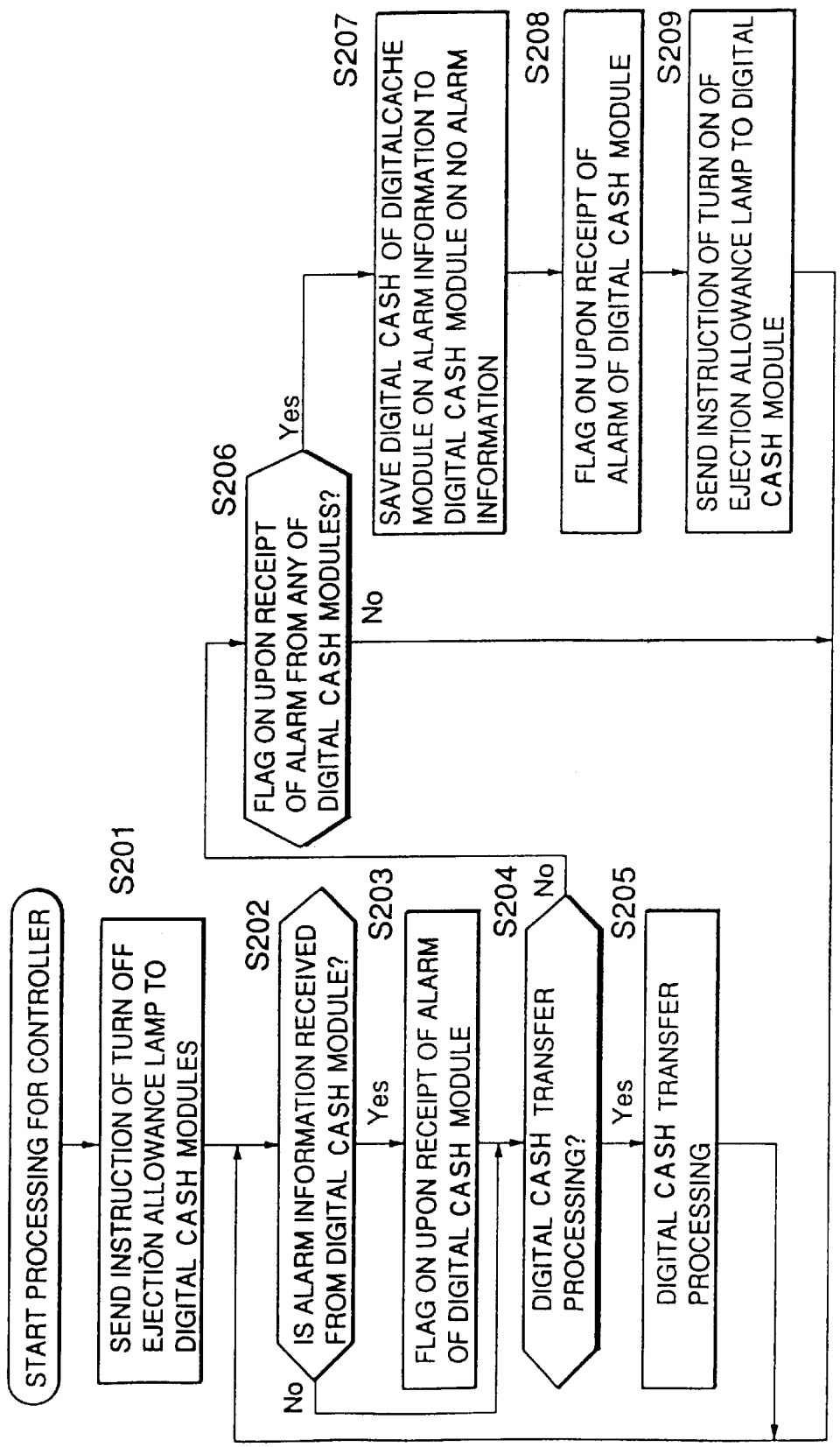

DIGITAL CASH SAFE

BACKGROUND OF THE INVENTION

1. Field of the Invention

The present invention relates to a digital cash safe for storing digital cash data serving as the currency and for inputting and outputting the digital cash data in accordance with a request for inputting and outputting the digital cash data from the exterior.

2. Description of the Prior Art

The above-mentioned digital cash data is electric data, and is more convenient than paper money and coin in the points that the digital cash data may be transferred via a communication network and may be stored in a small IC card. For this reason, recently, there have been proposed various technologies and various types of apparatus for utilizing the above-mentioned digital cash data as the currency indeed.

On the other hand, the digital cash data has a value as the currency in a similar fashion to that of paper money and coin. Accordingly, generation or production of the digital cash data is strictly restricted. For this reason, there is a need for banks and the like to save the digital cash data as well as paper money and coin. Thus, as an apparatus for saving the digital cash data, there has been proposed the digital cash safe as mentioned above.

Further, as mentioned above, the digital cash data can be transferred via a communication network. Consequently, as a utilizing form of the digital cash safe, there is considered such a utilizing form that a digital cash safe is set up at the bank center and the like so that digital cash data is sent from the digital cash safe via the communication network to terminals set up at the branches throughout the country and is transferred from the terminals to IC cards of the individuals.

However, as mentioned above, since the digital cash data is the electric data, there is a possibility that the digital cash data is lost owing to the life and the accident or the like of a storage medium for storing the digital cash data. Particularly, according to the digital cash safe which is utilized in the utilizing form as mentioned above, a great deal of digital cash is stored in the digital cash safe. Therefore, it is a serious loss that the digital cash data is lost by the accident and the like. On the other hand, it is not allowed that the backup of the digital cash data is prepared, because preparing the backup of the digital cash data corresponds to the counterfeiting of the currency.

In view of the foregoing, it is considered that the digital cash data is saved into a new storage medium before the storage medium has its day. However, as mentioned above, a great deal of digital cash is stored in the digital cash safe. Accordingly, as a saving work for the digital cash data is performed, the primary work such that digital cash data is transferred to the IC cards of the individuals is left undone.

SUMMARY OF THE INVENTION

In view of the foregoing, it is an object of the present invention to provide a digital cash safe capable of performing a saving work for the digital cash data, while lo the primary work is maintained.

To achieve the above-mentioned objects, the present invention provides a digital cash safe for storing digital cash data having a function of currency and for performing input and output of the digital cash data in accordance with a request from an exterior, said digital cash safe comprising:

a digital cash module for storing the digital cash data on a free basis in reading and writing;

a detector for detecting a sign of abnormality on said digital cash module; and a controller for instructing said digital cash module to perform input and output of the digital cash data in accordance with a request from an exterior, and in a case where said detector detects the sign of abnormality on said digital cash module, instructing output of the digital cash data stored in said digital cash module directed to a predetermined save destination while instructing on a priority basis the input and output of the digital cash data according to the request.

According to the digital cash safe of the present invention as mentioned above, the controller instructs output of the digital cash data stored in said digital cash module directed to a predetermined save destination while instructing on a priority basis the input and output of the digital cash data according to the request. This feature makes it possible to perform a save work of digital cash data, while maintaining the input and output of the digital cash data according to the request, which is the primary service.

In the above-mentioned digital cash safe according to the present invention, it is acceptable that when said detector detects the sign of abnormality, said controller instructs output of the digital cash data stored in said digital cash module directed to a save destination set up out of the digital cash safe.

Or alternatively, it is acceptable that a plurality of said digital cash modules exist, and a plurality of said detectors exist, said plurality of detectors being associated with said plurality of digital cash modules, respectively, each of said plurality of detectors detects the sign of abnormality on the associated digital cash module, and said controller instructs a save of the digital cash data stored in the digital cash module associated with a detector, which detects the sign, of said plurality of detectors to a digital cash module associated with other than the detector, which detects the sign, of said plurality of detectors.

In effect, it is either acceptable that the digital cash data, which is to be saved from the digital cash module on which a sign of abnormality is detected, is saved into a save destination provided within the digital cash safe, or a save destination set up out of the digital cash safe. For example, in the event that earthquake occurs, it is preferable that digital cash data is saved into a save destination set up, out of the digital cash safe, at a place located geographically apart from that place. On the other hand, for example, in the even that one of a plurality of digital cash modules has done its term of operation, it is preferable that the digital cash data is saved into another digital cash module which has not yet done its term of operation so that the service of the digital cash safe is maintained.

In the digital cash safe according to the present invention, it is preferable that said digital cash safe further comprises a first display means for indicating that said detector detects the sign of abnormality.

According to the digital cash safe having the first display means, it is possible for persons in charge of the digital cash safe to predict abnormality of a digital cash module prior to occurrence of the abnormality.

In the digital cash safe according to the present invention, it is preferable that said digital cash safe further comprises a second display means for,indicating that said digital cash module outputs right now the digital cash data directed to the predetermined save destination.

Further, in the digital cash safe according to the present invention, it is also preferable that said digital cash safe further comprises:

a substrate having a connector through which digital cash data is inputted and outputted with respect to said digital cash module, said substrate being detachably connected to said digital cash module via said connector, and a lock mechanism for inhibiting said digital cash module from being separated from said substrate when said digital cash module outputs right now the digital cash data directed to the predetermined save destination.

According to the digital cash safe having the second display means and/or the lock mechanism, it is possible to prevent digital cash data from being lost by an erroneous operation such that a digital cash module is ejected from the substrate while the digital cash module outputs right now the digital cash data directed to a save destination.

BRIEF DESCRIPTION OF THE DRAWINGS

FIGS. 4(A) and 4(B) are typical illustrations each showing a lock mechanism provided within a back panel.

FIGS. 5(A) and 5(B) are perspective views each showing digital cash modules in a module unit.

FIG. 6 is a typical illustration showing an internal structure of a digital cash module.

FIG. 9 is a schematic diagram showing an internal structure of a controller unit.

FIG. 10 is a flowchart useful for understanding an operation of a controller unit.

DETAILED DESCRIPTION OF PREFERRED EMBODIMENTS

Hereinafter, there will be described embodiments of the present invention.

Figure 1:
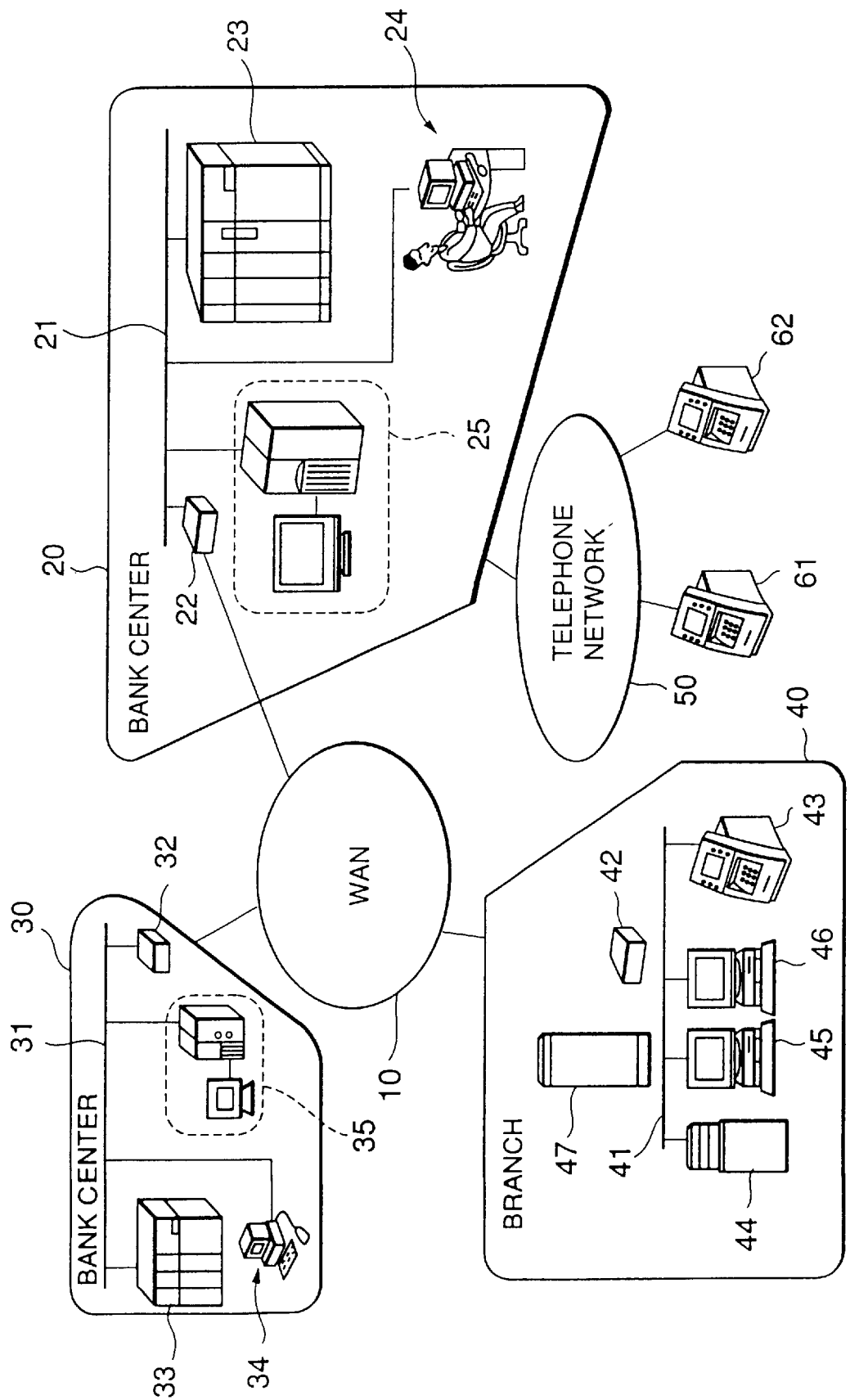
FIG. 1 is an illustration of a digital cash system including a digital cash safe according to an embodiment of the present invention.

FIG. 1 is an illustration of a digital cash system including a digital cash safe according to an embodiment of the present invention.

FIG. 1 shows a digital cash system, which is managed by a certain bank, wherein bank centers 20 and 30 and a branch 40 are interconnected through a wide area network (referred to as a "WAN") 10.

This digital cash system includes a plurality of bank centers 20 and 30, for the purpose of ensuring security of the system, and the bank centers 20 and 30 are located at places mutually apart from one another, for example, Tokyo and Osaka.

The bank centers 20 and 30 are provided with local area networks (referred to as "LAN") 21 and 31 for connecting computers and so on to one another within the bank centers 20 and 30, respectively. Respectively connected to the LANs 21 and 31 are routers 22 and 32 for connecting the LANs 21 and 31 with the WAN 10, host computers 23 and 33 for managing data of customers of the bank managing the digital cash system, card support systems 24 and 34 for managing IC cards issued by the bank managing the digital cash system, and digital cash safes 25 and 35 according to the embodiment of the present invention.

FIG. 1 typically shows the branch 40 of a plurality of branches which the bank managing the digital cash system possesses. The branch 40 is provided with a LAN 41 for connecting computers and so on to one another within the branch 40. Connected to the LAN 41 is a router 42 for connecting the LAN 41 with the WAN 10, a digital cash load machine 43 to which an IC card is inserted to input and output digital cash with respect to the IC card, a cash dispenser (CD) 44 for automatically performing a payment for paper moneys, terminals 45 and 46 used for a receipt and payment processing by bankers, and a server 47 for controlling various types of data transferred from the host computers 23 and 33 of the bank centers 20 and 30 via the WAN 10 to the digital cash load machine 43 set up within the branch 40.

Further, connected to the digital cash safe 25 of the bank center 20 are a number of digital cash load machines via a telephone network 50. In FIG. 1, there are typically illustrated two digital cash load machines 61 and 62. While it is not illustrated, also connected to the digital cash safe 35 of the bank center 30 are a number of digital cash load machines via a telephone network.

According to the digital cash system of the present embodiment, as a user, who possesses an IC card issued by the bank, inserts the IC card into the digital cash load machine 43 set up at the branch 40, or the digital cash load machines 61 and 62 connected to the telephone network 50, and inputs necessary data such as an identification number, the user is required for input or output of digital cash data to the digital cash safe 25 or 35, so that digital cash data is withdrawn from the digital cash safe 25 or 35, or digital cash data is deposited through the IC card in the digital cash safe 25 or 35.

Figure 2:
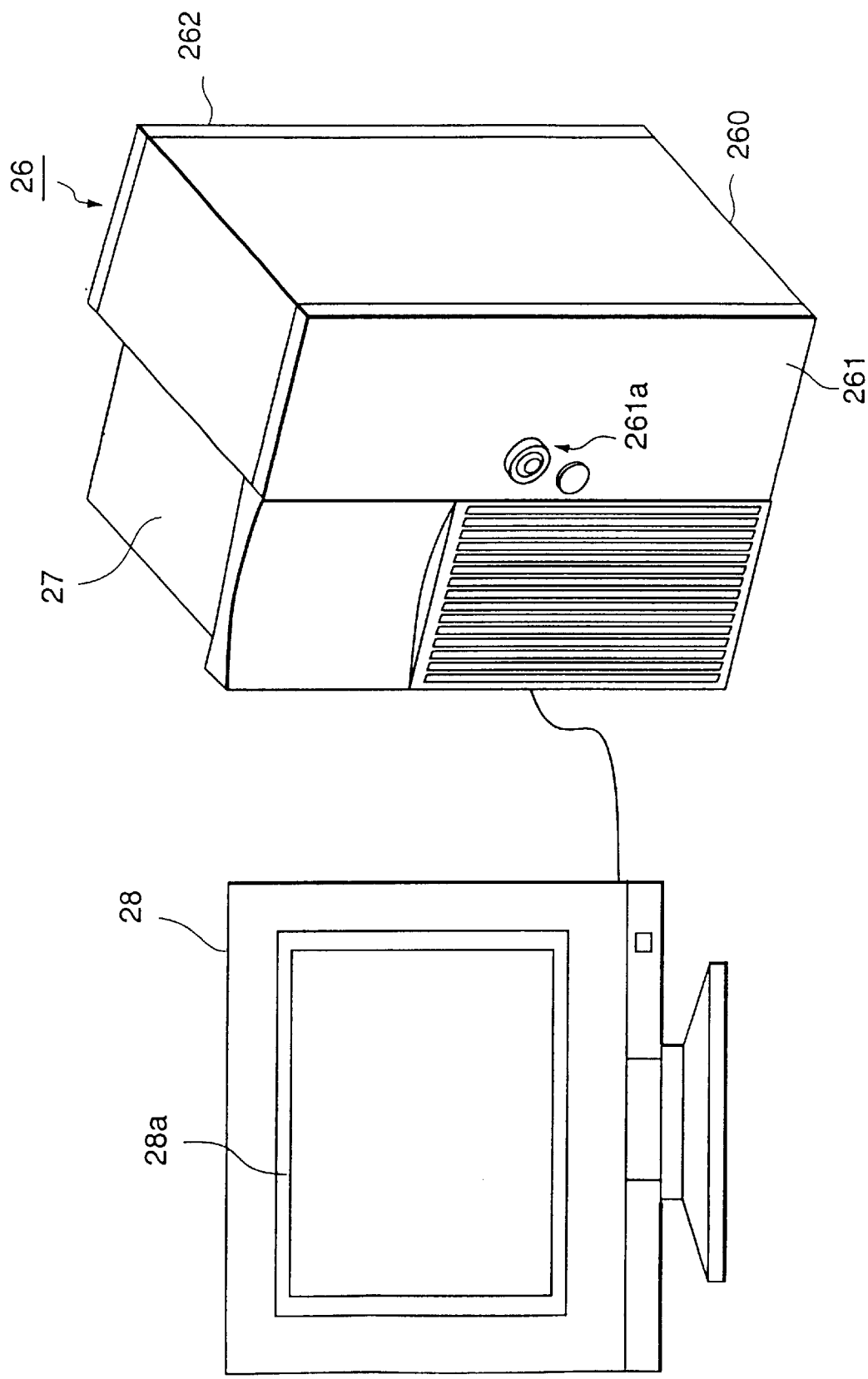
FIG. 2 is a perspective view of a digital cash safe.

FIG. 2 is a perspective view of a digital cash safe.

A module unit 26 accommodates digital cash modules each for storing digital cash data. The module unit 26 is covered by a safe 260 comprising a front door 261 having a dial type of lock 261a and a back door 262 having a cylinder lock.

A controller unit 27 incorporates thereinto a CPU, a RAM memory, a hard disk, etc. A display 28 performs a display on a display screen 28a in accordance with an instruction from the controller unit 27. The display 28 is an example of the first display means and the second display means referred to in the present invention. The controller unit 27 instructs a digital cash module accommodated in the module unit 26 to transfer digital cash data in accordance with requests from the digital cash load machines 43, 61 and 62. As a result, a transfer of digital cash data, as a service of the bank to be provided to the user, is performed. The controller unit 27 serves, in the event that a sign of abnormality, which will be described later, is detected on a digital cash module, instructs the digital cash module to save the digital cash data stored in the digital cash module.

Figure 3:
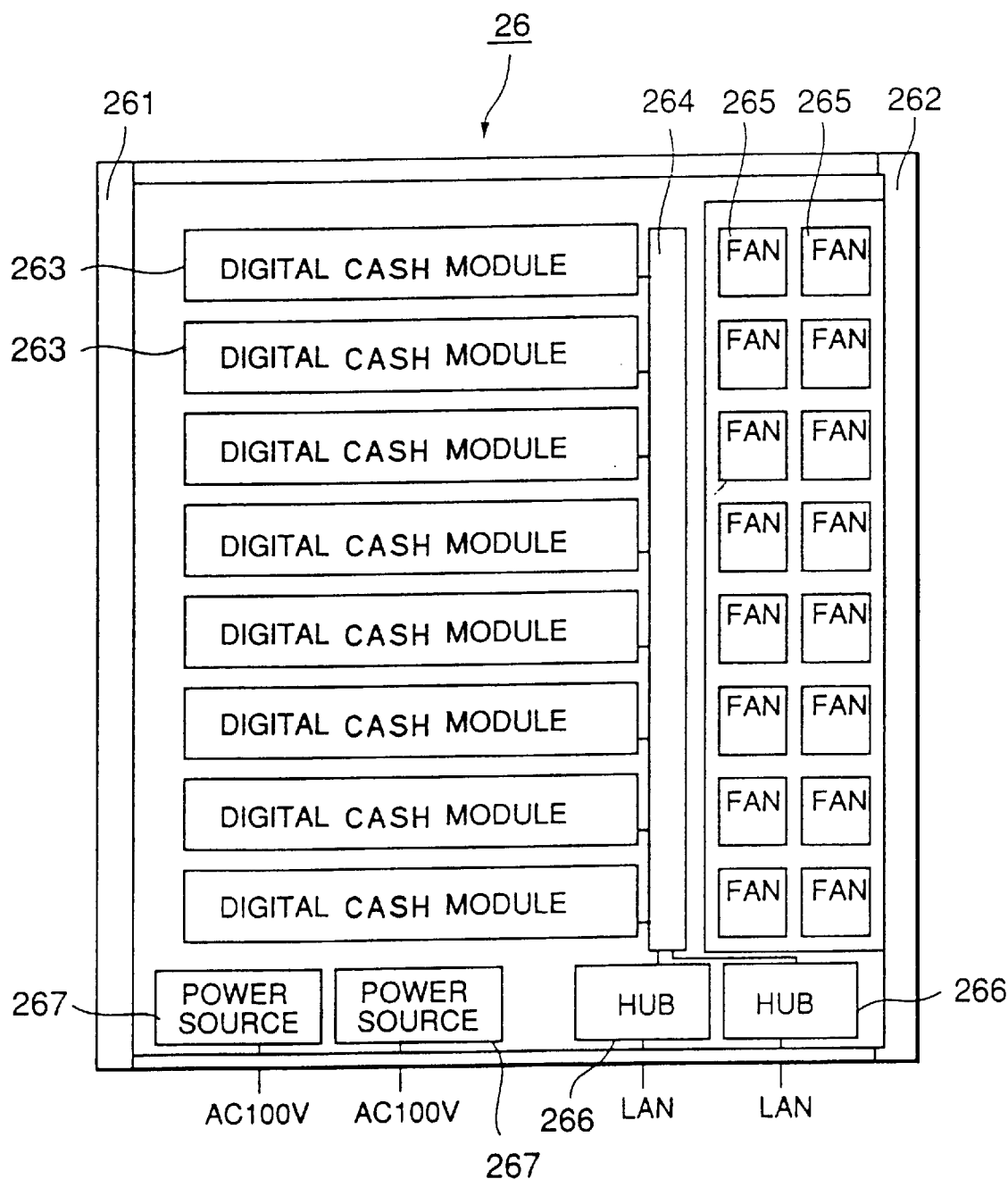
FIG. 3 is a sectional side elevation of a module unit.

FIG. 3 is a sectional side elevation of the module unit shown in FIG. 2.

The left side of FIG. 3 is the front of the module unit 26, and the right side of FIG. 3 is the back of the module unit 26.

The module unit 26 is capable of accommodating maximum eight digital cash modules 263 for storing digital cash data. The digital cash modules 263 are removably connected to a back panel 264 which is a common substrate. The digital cash module is stored in or drawn out from the module unit 26 in a state that the front door 261 is opened. The back panel 264 is provided with a lock mechanism which will be described later. The lock mechanism inhibits the digital cash module 263 from being separated from the back panel 264 while digital cash data is inputted or outputted through the digital cash module 263. At the rear of the back panel 264, there are provided fans 265 for cooling the digital cash modules 263. When the back door 262 is opened, the maintenance of the fans 265 may be performed.

The module unit 26 is provided with two hubs 266 for connecting the LAN 21 shown in FIG. 1 via the back panel 264 with the digital cash modules 263, and two power sources 267 for supplying electric power of AC 100V to the module unit 26. The reason why two hubs 266 and two power sources 267 are provided is for enhancing safety of the digital cash safe.

FIGS. 4(A) and 4(B) are typical illustrations each showing the lock mechanism provided within the back panel showing in FIG. 3.

Each of FIGS. 4(A) and 4(B) shows a connector 268a provided on the digital cash module 26.3 and a connector provided on the back panel. When the connector 268a and the connector 268b are coupled with one another, the digital cash module 263 is connected to the back panel. The digital cash data is transferred through the connector 268a and the connector 268b.

A lock mechanism 2640 comprises an electromagnet 2641, a key type of iron core 2642 and a spring 2643. As the electromagnet 2641 is conducted, the iron core 2642 is attracted downward as shown in FIG. 4(A), so that the iron core 2642 is engaged with a projection 2631 provided on the digital cash module 263. Thus, it is inhibited that the digital cash module 263 is withdrawn inadvertently by managers and the like who are in charge of the digital cash safe, and thereby preventing the digital cash data from being lost through an erroneous operation.

As the current of the electromagnet 2641 is stopped, as shown in FIG. 4(B), the iron core 2642 is pushed up by a spring force of the spring 2643, so that the iron core 2642 is separated from the projection 2631 provided on the digital cash module 263. Thus, managers and the like, who are in charge of the digital cash safe, are able to withdraw the digital cash module 263 in a direction of an arrow shown in FIG. 4(B).

FIGS. 5(A) and 5(B) are perspective views each showing digital cash module s in a module unit. FIG. 5(A) shows an appearance of the digital cash modules 263 which are accommodated into the module unit 26, looking those at the side of the front door 261 of the module unit 26, wherein seven digital cash modules 263 are accommodated into the module unit 26. A connector 268b provided on the back panel is connected to a connector provided on the eighth digital cash module.

FIG. 5(B) shows an appearance of the digital cash module 263 which is withdrawn from the module unit 26. The digital cash module 263 is provided with a handle 2632 for handling insertion and ejection of the into and from the module unit 26. Further, the digital cash module 263 is provided with an ejection allowance lamp 2633 for indicating that the digital cash module 263 is allowed to be ejected from the module unit 26, and an alarm lamp 2634 for indicating that a sign of abnormality is detected on the digital cash module 263. The alarm lamp 2634 is an example of the first display means referred to in the present invention. The ejection allowance lamp 2633 is an example of the second display means referred to in the present invention.

FIG. 6 is a typical illustration showing an internal structure of the digital cash module shown in FIGS. 3 and 5.

According to the present embodiment, the digital cash module 263 is provided with digital cash chips 2635 which substantially corresponds to IC chips incorporated into an IC card. This feature makes it possible to implement an ability of storing digital cash data. FIG. 6 shows sixteen digital cash chips 2635 by way of example. In other words, according to the present embodiment, an abnormality of the digital cash chips 2635 corresponds to an abnormality of the digital cash modules 263. The digital cash data is transferred between one digital cash chip and one IC card or two digital cash chips. It is inhibited that the digital cash data is produced and extinguished. A transfer processing of the digital cash data is controlled by the controller shown in FIG. 2. Incidentally, while it is omitted in illustration, the digital cash module 263 is provided with a power source for supplying an electric power to the digital cash chips 2635.

The life of the digital cash chips 2635 is about ten years or so. As the digital cash chips 2635 have done its term of operation, the digital cash data will be lost. Thus, there is a need to detect a sign of abnormality before the digital cash chips 2635 have done its term of operation and the abnormality appears. For this reason, the digital cash modules 263 is provided with a temperature sensor 2636a, a vibration sensor 2636b, a voltage sensor 2636c and a current sensor 2636d. The use of the temperature sensor 2636a serves to detect a sign appearing in the form of generation of heat on the digital cash chips 2635. The use of the vibration sensor 2636b serves to detect a vibration, such as earthquake and the like, which causes an abnormality on the digital cash chips. And the use of the voltage sensor 2636c and the current sensor 2636d serves to detect signs appearing on an applying voltage and a supplying current to the digital cash chips 2635, respectively. Therefore, the temperature sensor 2636a, the vibration sensor 2636b, the voltage sensor 2636c and the current sensor 2636d are examples of the detector referred to in the present invention.

As mentioned above, the digital cash modules 263 is provided with the ejection allowance lamp 2633 and the alarm lamp 2634, and in addition an alarm information mechanism 2637 to which detection results of the sensors 2636a, 2636b, 2636c and 2636d are fed. And as will be described later, the alarm information mechanism 2637 performs turn on and off of the ejection allowance lamp 2633 and the alarm lamp 2634.

Further, the digital cash modules 263 is provided with the connector 268a and an external access mechanism 2638. As mentioned above, the connector 268a is connected to the connector provided on the back panel. The external access mechanism 2638 serves as a control unit for the digital cash modules 263. As will be described later, the external access mechanism 2638 (control unit) controls input and output of the digital cash data by the digital cash chips 2635, controls an operation of the alarm information mechanism, and controls an operation of the above-mentioned lock mechanism as well.

Figure 7:
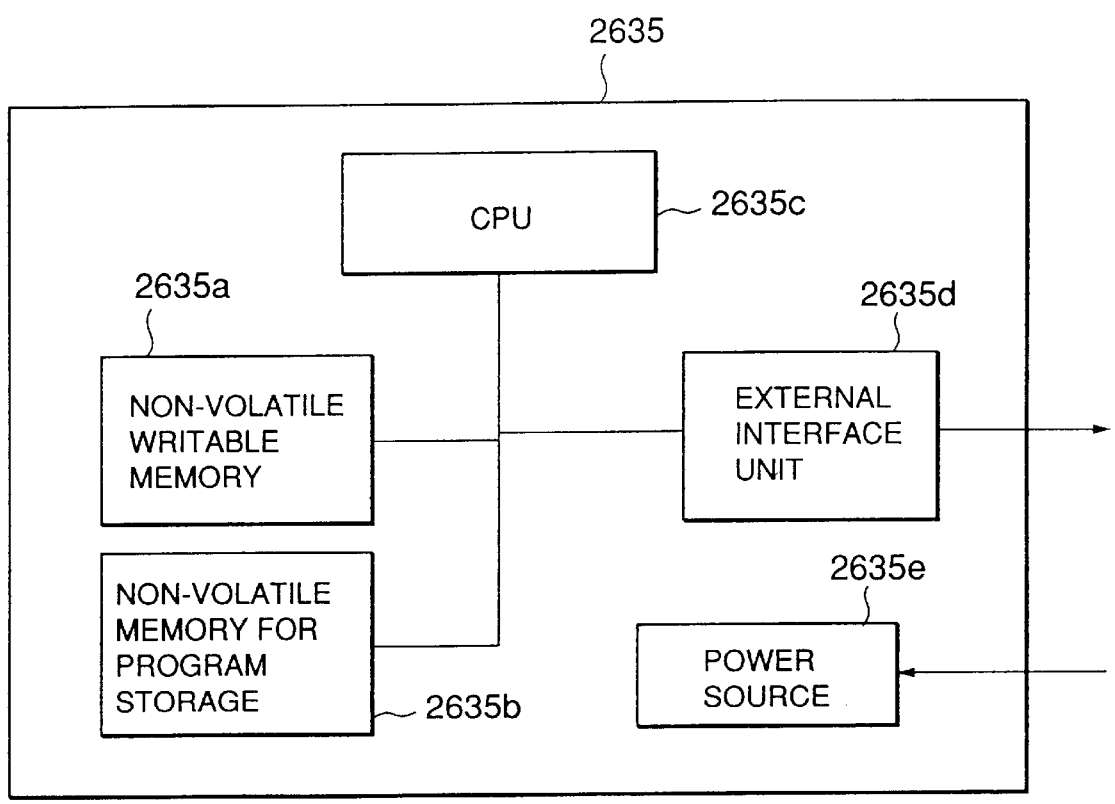
FIG. 7 is a schematic diagram showing an internal structure of a digital cash chip.

FIG. 7 is a schematic diagram showing an internal structure of the digital cash chip shown in FIG. 6.

The digital cash chips 2635 comprises a nonvolatile writable memory 2635a, a non-volatile memory 2635b, a CPU 2635c, an external interface unit 2635d, and a power source 2635e. The non-volatile writable memory 2635a stores therein digital cash data. The non-volatile memory 2635b stores therein a program used in the CPU 2635c. The CPU 2635c performs read and write of digital cash data for the non-volatile writable memory 2635a, and a transfer of digital cash data via the external interface unit 2635d, in accordance with the program stored in the non-volatile memory 2635b and an instruction issued from the external access mechanism 2638 (control unit) shown in FIG. 6. The power source 2635e is connected to the power sources of the digital cash modules to supply an electric power to the CPU 2635c and so on.

Figure 8:
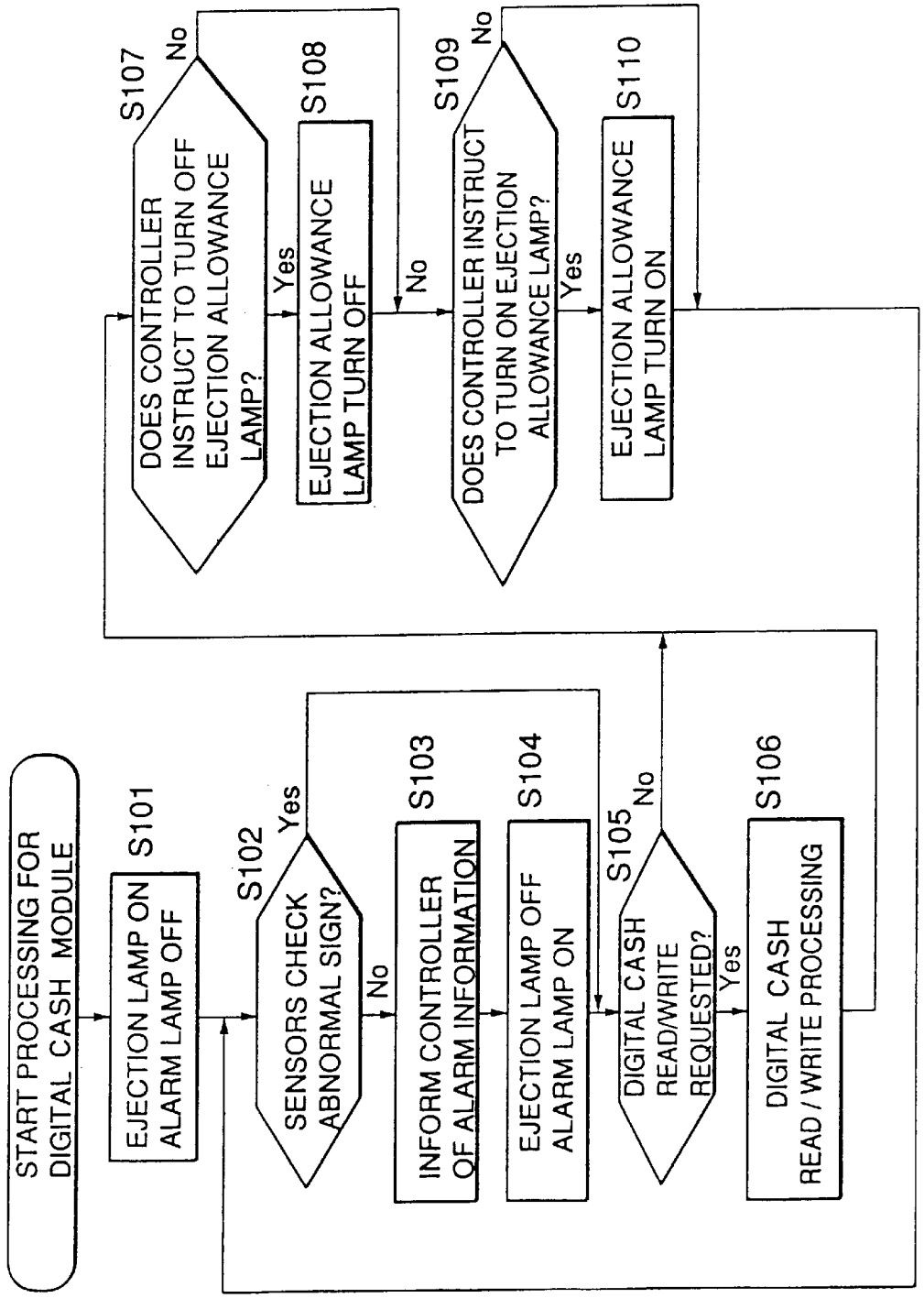
FIG. 8 is a flowchart useful for understanding an operation of a digital cash module.

FIG. 8 is a flowchart useful for understanding an operation of the digital cash modules shown in FIG. 6.

An operation of a digital cash module according to this flowchart is started as the digital cash module is inserted into the module unit 26.

As the digital cash module starts its operation, first, in step S101, the external access mechanism (control unit) 2638 shown in FIG. 6 gives a predetermined instruction to the alarm information mechanism 2637 so that the ejection allowance lamp 2633 turns on and the alarm lamp 2634 turns off.

Next the process goes to step S102 in which the alarm information mechanism 2637 checks detection results as to the abnormality sign by the above-mentioned four sensors 2636a, 2636b, 2636c and 2636d. In the event that the abnormality sign is detected, the process goes to step S103 in which the alarm information mechanism 2637 informs the controller unit 27 shown in FIG. 2 of alarm information indicative of the matter that the abnormality sign is detected via the external access mechanism (control unit) 2638. Then, the process goes to step S104 in which the external access mechanism (control unit) 2638 instructs the alarm information mechanism 2637 to turn off the ejection allowance lamp 2633 and turn on the alarm lamp 2634, and then the process goes to step S105. In the step S102, in the event that the abnormality sign is detected, the process goes to the step S105.

In the step S105 and step S106, it is determined as to whether the input and output of digital cash data was instructed by the controller unit 27 shown in FIG. 2. In the event that it is determined so, the external access mechanism (control unit) 2638 shown in FIG. 6 instructs the digital cash chips 2635 to perform the read and write of the digital cash data, so that input and output of the digital cash data are carried out.

Thereafter, the process goes to steps S107 and S108 in which as the controller unit 27 shown in FIG. 2 instructs to turn off the ejection allowance lamp 2633, upon receipt of an instruction from the external access mechanism (control unit) 2638 shown in FIG. 6, the alarm information mechanism 2637 turns off the ejection allowance lamp 2633, and the lock mechanism 2640 shown in FIG. 4 locks the digital cash module on the back panel.

Similarly, in steps S109 and S110, as the controller unit 27 instructs to turn on the ejection allowance lamp 2633, upon receipt of an instruction from the external access mechanism (control unit) 2638, the alarm information mechanism 2637 turns on the ejection allowance lamp 2633, and the lock mechanism 2640 is released in lock.

Thereafter, the process returns to the step S102.

FIG. 9 is a schematic diagram showing An internal structure of the controller unit shown in FIG. 2.

The controller unit 27 comprises a CPU 271, a RAM 272, a hard disk 273, a display processing unit 274, an external interface unit 275, and a power source 276. The controller unit 27 is connected to the module unit 26 shown in FIG. 2 via the external interface unit 275 and the LAN 21 shown in FIG. 1.

The hard disk 273 stores therein a program indicating an operation of the controller unit 27. The CPU 271 performs an instruction for input and output of digital cash data in accordance with the program stored in the hard disk 273, which will be described later. Further, the CPU 271 may also control simultaneously a plurality of transfer treatments.

The RAM 272 prepares a storage area for variables and eight storage areas 272a for an alarm receipt flag indicating as to whether alarm information is received by the alarm information mechanism 2637 shown in FIG. 6. First to eighth storage areas 272a correspond to eight digital cash modules 263 shown in FIG. 3, respectively. In FIG. 9, however, the third to seventh storage areas 272a are omitted in illustration.

The display processing unit 274 instructs the display 28 shown in FIG. 2 to perform a screen display. Applied to the power source 276 is AC 100V so that an electric power is supplied from the power source 276 to the respective sections of the controller unit 27.

FIG. 10 is a flowchart useful for understanding an operation of the controller unit shown in FIG. 2.

An operation shown in the flowchart starts as the power source of the controller unit 27 turns on.

As an operation of the controller unit 27 starts, first, in step S201, the digital cash module 263 is instructed to turn off the ejection allowance lamp 2633, and there is displayed on the display screen 28a of the display 28 shown in FIG. 2 a message that "the whole digital cash modules are not allowed to be ejected".

Next, the process goes to steps S202 and S203 in which when any one of the digital cash modules 263 shown in FIG. 3 issues alarm information, the alarm receipt flag associated with the digital cash module 263, which issued the alarm information, is set up to an "ON" state, and there is displayed on the display screen 28a of the display 28 shown in FIG. 2 a message that "a sign of abnormality is detected on the digital cash module issued the alarm information". And then the process goes to step S204.

In the step S204, it is determined as to whether the number of the transfer treatments for digital cash data between the IC cards inserted into the digital cash load machines 43, 61 and 62 shown in FIG. 1 and the digital cash chips 2635 shown in FIG. 6 exists by the number exceeding the half of the number of the transfer treatments, which the controller unit can simultaneously control, for example. If the determination result is "Yes", it means that the controller unit is busy in the primary service, and the process goes to step S205 in which a transfer of digital cash data between the IC cards and the digital cash modules is performed. And then the process returns to the step S202. In effect, in the event that the controller unit is busy in the primary service, the controller unit performs only the primary service even if the alarm information is received, thereby ensuring services to be provided for customers by banks and the like.

If the determination result in the step S204 is "No", the process goes to step S206 in which it is determined as to whether an alarm receipt flag indicative of the "ON" state exists. And when it is decided that any of the alarm receipt flags offer the "OFF" state, the process returns to the step S202.

In the step S206, when it is decided that there is the alarm receipt flag indicative of the "ON" state, it means that there is a digital cash module involved in a possibility of abnormality. And then the process goes to step S207 in which digital cash data, which is stored in the digital cash module associated with the alarm receipt flag indicative of the "ON" state, is saved into the digital cash module associated with the alarm receipt flag indicative of the "OFF" state. However, in the event that a sign of abnormality is simultaneously detected on a plurality of digital cash modules, there is a high possibility that abnormality occurs on all of the digital cash modules within the digital cash safe 25. Thus, in this case, the digital cash data is saved into the digital cash safe 35. Thereafter, the process goes to step S208 in which the alarm receipt flag associated with the digital cash module undergone saving is set up to the "OFF" state, and an instruction of input and output for the digital cash module undergone saving is inhibited. Then, the process goes to step S209 in which the digital cash module undergone saving is instructed to turn on the ejection allowance lamp, and there is displayed on the display screen 28a of the display 28 shown in FIG. 2 a message that wan ejection of the digital cash module undergone saving is allowed. And then the process returns to step S202.

Incidentally, according to the digital cash modules of the present embodiment, the use of the digital cash chips implement an ability of storing digital cash data. However, it is acceptable that as the digital cash modules referred to in the present invention, a storage medium such as a hard disk is used to store the digital cash data.

According to the present embodiment, a sign of abnormality occurred on the digital cash modules is detected by the temperature sensor and so on. However, it is acceptable that as the digital cash safe referred to in the present invention, a storage medium for storing digital cash data is formed with a triple structure, and the respective associated datum are compared with one another to detect a sign of abnormality, or alternatively it is acceptable that parity data such as a CRC is stored together with digital cash data, and the parity data is checked to detect a sign of abnormality.

Further, according to the present embodiment, in the event that the controller unit is busy on the primary service, a save of digital cash data is inhibited. However, according to the digital cash safe of the present invention, it is acceptable that in the event that the controller unit is busy on the primary service, digital cash data is saved little by little.

As mentioned above, according to a digital cash safe of the present invention, it is possible to perform a saving work for digital cash data while the primary service is maintained.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A digital cash safe for storing digital cash data having a function of currency and for performing input and output of the digital cash data in accordance with a request from an exterior, said digital cash safe comprising:
   a digital cash module for storing the digital cash data on a free basis in reading and writing;
   a detector for detecting a sign of abnormality on said digital cash module;
   a controller for instructing said digital cash module to perform input and output of the digital cash data in accordance with a request from an exterior, and in a case where said detector detects the sign of abnormality on said digital cash module, instructing output of the digital cash data stored in said digital cash module directed to a predetermined save destination while instructing on a priority basis the input and output of the digital cash data according to the request;
   a substrate having a connector through which digital cash data is inputted and outputted with respect to said digital cash module, said substrate being detachably connected to said digital cash module via said connector, and
   a lock mechanism for inhibiting said digital cash module from being separated from said substrate when said digital cash module outputs light now the digital cash data directed to the predetermined save destination.

2. A digital cash safe according to claim 1, wherein when said detector detects the sign of abnormality, said controller instructs output of the digital cash data stored in said digital cash module directed to a save destination set up out of the digital cash safe.

3. A digital cash safe according to claim 1, wherein a plurality of said digital cash modules exist, and a plurality of said detectors exist, said plurality of detectors being associated with said plurality of digital cash modules, respectively, each of said plurality of detectors detects the sign of abnormality on the associated digital cash module, and
   said controller instructs a save of the digital cash data stored in the digital cash module associated with a detector, which detects the sign, of said plurality of detectors to a digital cash module associated with other than the detector, which detects the sign, of said plurality of detectors.

4. A digital cash safe according to claim 1, wherein said digital cash safe further comprises a first display means for indicating that said detector detects the sign of abnormality.

5. A digital cash safe according to claim 4, wherein said digital cash safe further comprises a second display means for indicating that said digital cash module outputs right now the digital cash data directed to the predetermined save destination.

* * * * *